May 23, 1933.  J. MILLEN  1,910,624
DIAL DEVICE
Filed July 23, 1931
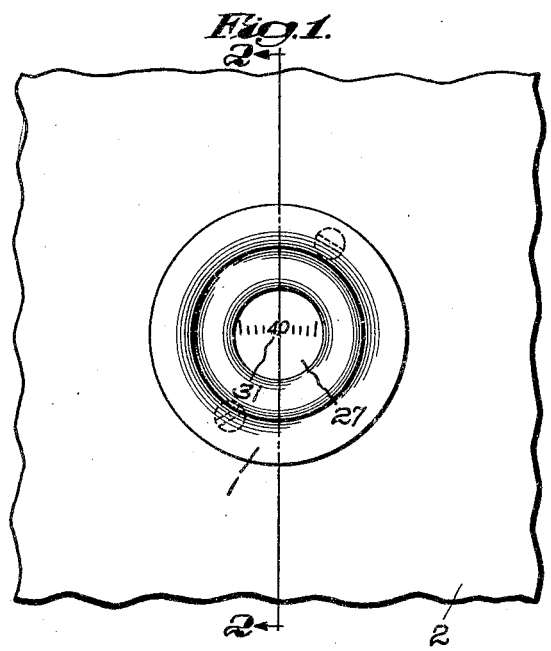
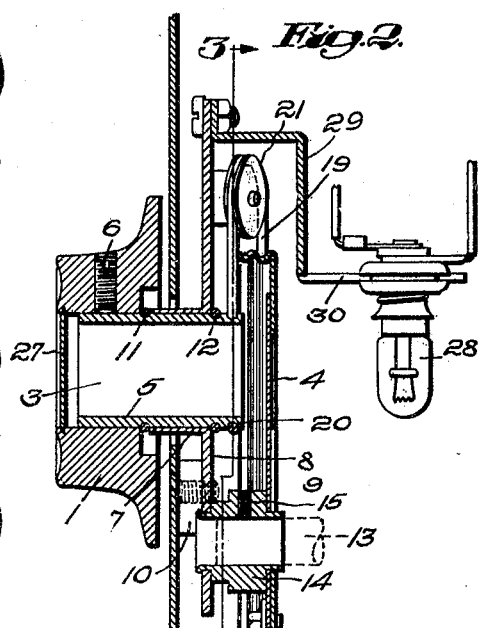
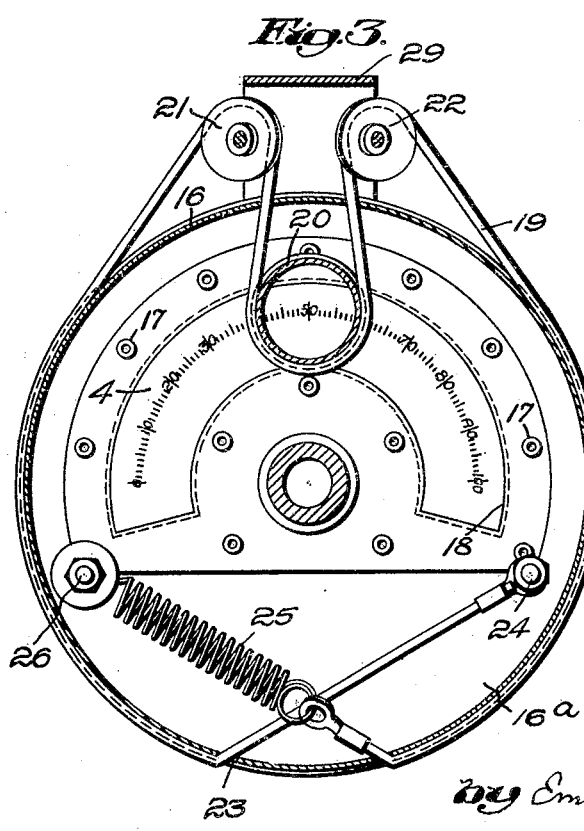
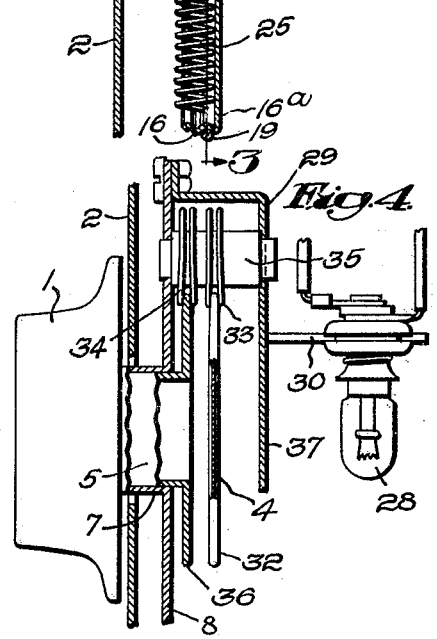
Inventor:
James Millen
by Emery, Booth, Varney & Townsend
Attys Patented May 23, 1933

1,910,624

UNITED STATES PATENT OFFICE

JAMES MILLEN, OF MALDEN, MASSACHUSETTS

DIAL DEVICE

Application filed July 23, 1931. Serial No. 552,678.

My invention aims to provide improvements in dial devices for radio and like apparatus.

In the drawing which illustrates preferred embodiments of my invention:—

Figure 1 is a front elevation of one form of my dial installation showing a portion of a panel to which it is attached and showing the markings which may be viewed through the knob;

Fig. 2 is an enlarged section taken on the line 2—2 of Figure 1;

Fig. 3 is a section taken on the line 3—3 of Fig. 2; and

Fig. 4 is a vertical section taken through a portion of a dial structure showing a different type of drive from that shown in Figs. 1 through 3.

Referring to the devices illustrated by the drawing, I have shown dial structures which are particularly, though not exclusively, useful in connection with radio transmitting and receiving apparatus. Heretofore the scale used in connection with a dial apparatus was located behind an apertured cover plate secured to the front face of the panel of the radio apparatus or was mounted behind the panel in such a manner that a portion of the scale was visible through the aperture. My invention eliminates the necessity for providing an aperture in the cover plate or in the panel, the sole purpose of which is to permit observation of the scale of the dial apparatus. I have accomplished this by providing a knob 1 exposed at the front face of a panel 2, the knob being provided with a bore 3 in combination with a scale 4 adapted to be moved by the inner end of the bore 3.

Referring now to the specific embodiment of my invention illustrated in Figs. 1 through 3, I have shown a dial device which includes the broad features of my invention mentioned above. The knob 1 may be of any suitable size and shape and is detachably secured to a sleeve 5 by means of a suitable screw 6 (Fig. 2) and the sleeve is mounted for rotation in a bearing 7 provided by a plate 8 mounted at the inner side of the panel 2 by means of suitable screws 9 and spacing members 10, as best shown in Figs. 2 and 3. The sleeve 5 is held in assembled relation with the bearing 7 by suitable split rings 11 and 12 snapped into grooves located at opposite ends of the bearing 7.

My invention is adapted for use in connection with the operation of a movable part of a radio or like apparatus, but in the specific illustration I have shown a device which is adapted to be attached to a shaft 13 (shown in dotted lines, Fig. 2) of the rotary part of an instrument such, for instance, as a condenser. Therefore, I have shown a hub member 14 (Fig. 2) rotatably secured to the plate 8 below the bearing 7 and having a set screw 15 adapted to engage the shaft 13. A relatively large pulley 16 is suitably attached to the hub 14 for rotation therewith and the scale 4 is attached to a web 16$^a$, as by means of rivets 17, so that it covers an arcuate slot 18 (Figs. 2 and 3) formed in the web 16$^a$.

Any suitable means may be used to rotate the pulley 16 by turning the knob 1 either in a clockwise or a contra-clockwise direction. However, in Figs. 2 and 3 I have provided a flexible driving connection in the form of a round belt 19 which passes around the sleeve 5 in a groove 20 provided either directly by the sleeve 5 or by suitable friction flanges attached to the sleeve 5. The belt 19 also passes around pulleys 21 and 22 (Fig. 3) and then part way around the pulley 16. The ends of the belt 19 pass through slots 23 in the face of the pulley 16 and one end is secured directly to the web 16$^a$ by means of a bolt 24, as best shown in Fig. 3. The other end is secured to one end of a spring 25. The other end of the spring is secured directly to the web 16$^a$ by a bolt 26 so that there is a tension exerted upon the belt 19 at all times by the spring 25. Thus when the knob is rotated the shaft 13 will be rotated at a reduced ratio in substantially the same manner as more fully illustrated and described in United States Letters Patent No. 1,751,658, issued March 25, 1930, to William A. Ready, at least so far as the method of driving is concerned.

My invention is intended to cover a device wherein the scale markings may be accurately observed at the bore 3 provided in the knob 1 and the sleeve 5. To this end I have provided means for illumination of a translucent scale, also a screen adapted to rotate with the knob 1 and receive images from the scale and means arranged to provide a fixed mark on the screen so that the degree of rotation of the device may be visible from a position in front of the knob 1. In Figs. 1 and 2 I have shown a translucent screen 27 suitably secured adjacent to the bore 3 at the front face of the knob 1. Illumination is provided by an electric lamp 28 detachably secured to a bracket 29 attached to the upper end of the plate 8. The bracket 29 has a slot 30 formed therein to permit adjustment of the lamp toward and away from the scale 4, thereby to provide an adjustment whereby the clearness and size of the images transferred from the scale 4 to the screen 27 may be regulated.

In operation it is merely necessary to turn the knob 1 in a clockwise or a contra-clockwise direction to cause the belt means to rotate the pulley 16, which in turn will rotate the shaft 13 of the device to be regulated. The degree of rotation of the shaft 13 is readily observed through the bore 3 or, if the device is illuminated, by observing the images (Fig. 1) as they are projected from the scale 4 upon the screen 27.

If it is desirable to provide a fixed mark by which to observe the degree of movement, as indicated by the lines and numbers of the scale, I may accomplish this result by providing a dot 31 (Fig. 1) on the screen at the center so that it remains in the same position with relation to the remainder of the apparatus. Another means of providing a fixed indication will be described in connection with the structure illustrated in Fig. 4.

Referring now to the type of driving mechanism shown in Fig. 4, I have illustrated a friction disc drive instead of the belt drive illustrated in Figs. 1 and 2. This friction disc drive includes a thin dial plate 32 carrying the scale 4 instead of the large pulley 16, in combination with two sets of yieldable discs 33 and 34 mounted upon a counter shaft 35 in substantially the manner illustrated. The discs 33 engage the edge of the dial plate 32 between them and the discs 34 engage a flange 36 located at the inner end of the sleeve 5. With this type of drive when the knob 1 is rotated the sleeve 5 will, of course, be rotated and the flange 36 will rotate the counter shaft 35, thereby rotating the discs 33 which in turn rotate the dial plate 32 at a slower ratio than the rotation of the knob 1.

In Fig. 4 I have shown a relatively thin narrow indicator finger 37 extending downwardly between the light 28 and the scale 4, thereby to cast a line shadow upon the screen 27 to block out the mark at the center of the screen, thereby providing a fixed point of indication. This finger 37 may be formed from the material cut from the bracket 29 to form the slot 30.

My improved dial device is attractive, simple in construction and is particularly desirable because it requires fewer parts to secure the desired result and is easy to attach to the panel of a radio set or the like, because it is necessary to form only one opening in the panel aside from the apertures through which the screws 9 pass to secure the structure directly to the panel. Heretofore, it was necessary to provide an aperture for passage of the shaft upon which the knob is mounted and also an aperture through which the markings on the dial could be observed. In most instances, especially in connection with dial structures mounted behind a panel, an escutcheon plate of some type is used. With my device no escutcheon plate is necessary.

While I have illustrated and described preferred embodiments of my invention, I do not wish to be limited thereby, because the scope of my invention is best defined by the following claims.

I claim

1. In a dial device of the class described, a control mechanism adapted to operated a movable part of an instrument with which said dial device is to be associated when in use, a scale device movable with said control mechanism to indicate the degree of movement of the movable part of the instrument, a knob associated with the control means for manipulation thereof, said knob having an aperture therethrough in line with a portion of the scale through which the markings on the scale may be read, a translucent screen attached to and rotatable with said knob to cover the aperture therethrough, light means mounted to project to said screen the markings on the scale which are located in line with the aperture in said knob and means arranged to provide a definitely positioned mark on the screen relative to which the images projected on the screen move when the knob is rotated.

2. In a dial device of the class described, a control mechanism adapted to operate a movable part of an instrument with which said dial device is to be associated when in use, a scale device movable with said control mechanism to indicate the degree of movement of the movable part of the instrument, a knob associated with the control means for manipulation thereof, said knob having an aperture therethrough in line with a portion of the scale through which the markings on the scale may be read, a translucent screen attached to and rotatable with said knob to cover the aperture therethrough, light means mounted to project to said screen the markings on the scale which are located in line with the aperture in said knob and a fixed device located between the light means and the said screen thereby to cast a stationary line shadow upon the screen for the purposes described.

In testimony whereof, I have signed my name to this specification.

JAMES MILLEN.